United States Patent
Steinberg et al.

(10) Patent No.: US 6,304,298 B1
(45) Date of Patent: Oct. 16, 2001

(54) METHOD AND APPARATUS FOR DETERMINING THE POSITION OF A TV CAMERA FOR USE IN A VIRTUAL STUDIO

(75) Inventors: Alexander Steinberg; Zinovy Livshits, both of Raanana; Itzhak Wilf, Ramat-Gan; Moshe Nissim, Raanana; Michael Tamir, Tel-Aviv; Avi Sharir, Ramat Hasharon; David Aufhauser, Tel-Aviv, all of (IL)

(73) Assignee: Orad Hi Tec Systems Limited, Kfar Saba (IL)

( * ) Notice: Subject to any disclaimer, the term of this patent is extended or adjusted under 35 U.S.C. 154(b) by 0 days.

(21) Appl. No.: 08/765,898
(22) PCT Filed: Sep. 9, 1996
(86) PCT No.: PCT/GB96/02227
  § 371 Date: Jul. 2, 1997
  § 102(e) Date: Jul. 2, 1997
(87) PCT Pub. No.: WO97/09830
  PCT Pub. Date: Mar. 13, 1997

(30) Foreign Application Priority Data

Sep. 8, 1995 (GB) .................................................. 9518432

(51) Int. Cl.[7] .................................................. H04N 9/74
(52) U.S. Cl. .................... 348/587; 348/590; 348/586; 348/140; 348/25; 348/700
(58) Field of Search .................................... 348/587, 586, 348/590, 591, 592, 578, 140, 25, 700, 118; 382/284; 702/152; H04N 9/74

(56) References Cited

U.S. PATENT DOCUMENTS

| | | | |
|---|---|---|---|
| 2,974,190 | 3/1961 | Geiger | 178/7.1 |
| 3,848,082 | * 11/1974 | Summers | 348/907 |
| 3,887,762 | 6/1975 | Uno et al. | 178/6 |

(List continued on next page.)

FOREIGN PATENT DOCUMENTS

| | | |
|---|---|---|
| 57093788 | * 6/1982 | (JP) . |
| 57-93788 | 10/1982 | (JP) . |
| WO 93/02524 | 2/1993 | (WO) . |
| WO 93/06691 | 4/1993 | (WO) . |
| WO 94/05118 | 3/1994 | (WO) . |
| WO 95/30312 | 11/1995 | (WO) . |
| WO 97/09823 | 3/1997 | (WO) . |

OTHER PUBLICATIONS

Adiv, G., "Determining Three–Dimensional Motion and Structure from Optical Flow Generated by Several Moving Objects", *IEEE trans. Pattern Analysis and Machine Intelligence*, 1985, 7, 384–401.

Cafforio et al., "The Differential Method for Motion Estimation", in: Image Sequence Processing and Dynamic Scene Analysis, T.S. Huang (ed.) Spring, Berlin, 1983, 104–124.

Haseba et al., "Real–Timing compositing system of a real camera image and a computer graphic image", International Broadcasting Covention, Sep. 16–20, 1994, Conf. Publ. No. 397, IEE 1994, pp. 656–660.

Weng et al., "Calibration of Stereo Cameras Using a Non–Linear Distortion Model", *IEEE 10th. Intl. Conf. Pattern Recognition*, Jun. 16–21, 1990, 246–253.

(List continued on next page.)

*Primary Examiner*—Reinhard J. Eisenzopf
*Assistant Examiner*—Linus H. Lo
(74) *Attorney, Agent, or Firm*—Woodcock Washburn Kurtz Mackiewicz & Norris LLP

(57) ABSTRACT

A method of determining the position of a TV camera relative to a patterned panel being viewed by the TV camera including the steps of:
  identifying a plurality of edge points of the pattern from the video signal produced by said camera and using these edge points to calculate the perspective of the pattern relative to the camera.

13 Claims, 6 Drawing Sheets

U.S. PATENT DOCUMENTS

| | | | |
|---|---|---|---|
| 3,973,239 | 8/1976 | Kakumoto et al. | 340/146.3 |
| 4,000,399 | 12/1976 | Kawahara | 235/92 |
| 4,010,446 | 3/1977 | Kawa | 340/146.3 |
| 4,200,890 | 4/1980 | Inaba et al. | 358/183 |
| 4,393,394 | 7/1983 | McCoy | 358/22 |
| 4,394,680 | 7/1983 | Watanabe | 358/22 |
| 4,396,939 | 8/1983 | Kitahama | 358/22 |
| 4,409,611 | 10/1983 | Vlahos et al. | 358/22 |
| 4,409,618 | 10/1983 | Inaba et al. | 358/183 |
| 4,488,169 | 12/1984 | Yamamoto | 358/22 |
| 4,533,937 | 8/1985 | Yamamoto et al. | 358/22 |
| 4,547,897 | 10/1985 | Peterson | 382/8 |
| 4,566,126 | 1/1986 | Miyagawa et al. | 382/48 |
| 4,621,280 | 11/1986 | Shinohara et al. | 358/22 |
| 4,628,363 | 12/1986 | Kashiwa et al. | 358/183 |
| 4,630,101 | 12/1986 | Inaba et al. | 358/183 |
| 4,947,240 | 8/1990 | Hausdorfer | 358/22 |
| 4,949,165 | 8/1990 | Rieman et al. | 358/10 |
| 4,979,021 | 12/1990 | Thomas | 358/22 |
| 5,264,933 | 11/1993 | Rosser et al. | 358/183 |
| 5,353,392 | 10/1994 | Luquet et a. | 395/135 |
| 5,436,672 * | 7/1995 | Medioni et al. | 348/591 |
| 5,488,675 | 1/1996 | Hanna | 382/284 |
| 5,491,517 | 2/1996 | Kreitman et al. | 348/581 |
| 5,502,482 * | 3/1996 | Graham | 348/140 |
| 5,566,251 * | 10/1996 | Hanna et al. | 382/284 |
| 5,638,116 * | 6/1997 | Shimoura et al. | 348/118 |
| 5,892,554 * | 4/1999 | DiCicco et al. | 348/584 |
| 5,917,553 * | 6/1999 | Honey et al. | 348/578 |
| 5,930,740 * | 7/1999 | Mathisen | 702/152 |
| 6,122,014 * | 9/2000 | Panusopone et al. | 348/592 |

OTHER PUBLICATIONS

Sommerhauser, F., "Das Virtuelle Studio Grundlagen Einer neuen Studioproduktionstechnik", Fernseh–Und Kino–Technik 50, Jahrgang Nr. 1–2/1996 (English language abstract included).

Canny, J. A Computational Approach to Edge Detection *IEEE Trans. On PAMI, PAMI–8*, No. 6, 1986, 679–697.

Illingworth et al. A Survey of the Hough Transform *CVGIP*, 1988, 44:87–116.

Serra J. Image Analysis and Mathematical Morphology, Academic Press, London 1982.

Rosenfeld et al. Digital Picture Processing, Academic Press 1982 2:84–112.

Das Virtuelle Studio Grundlagen Einer neuen Studioproduktionstechnik Fernseh–Und Kino–Technik 50, Jahrgang Nr. 1–2/1996.

* cited by examiner

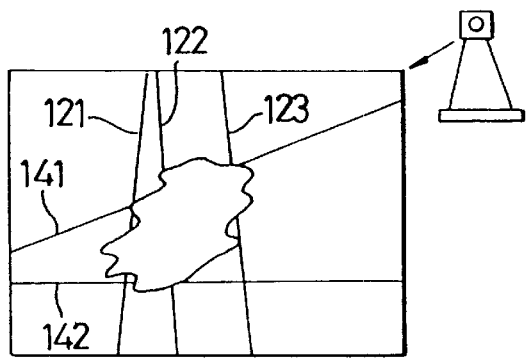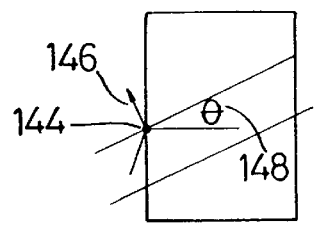
*Fig. 4*      *Fig. 5*
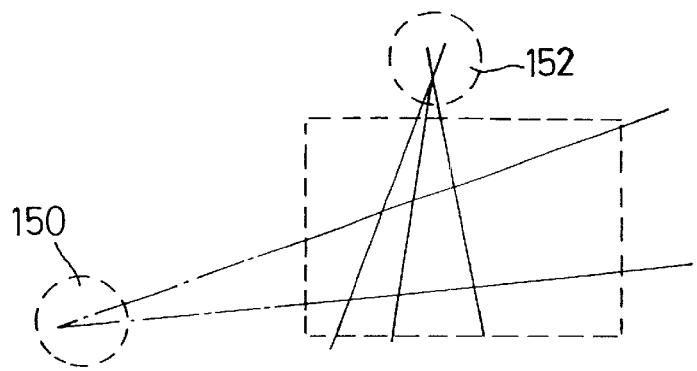
*Fig. 6*
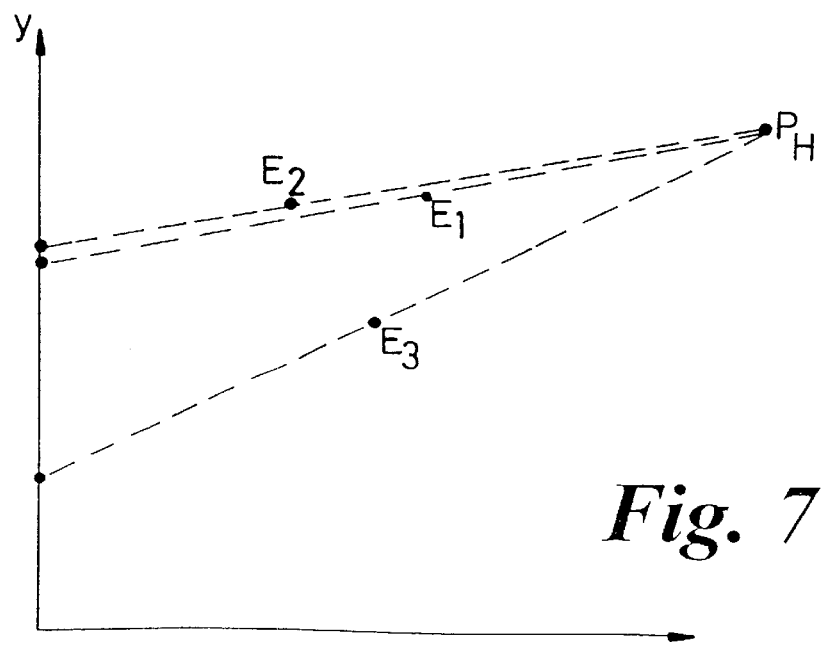
*Fig. 7* pre-transformation camera transformation

METHOD AND APPARATUS FOR DETERMINING THE POSITION OF A TV CAMERA FOR USE IN A VIRTUAL STUDIO

The present invention relates to methods and apparatus for creating virtual images and for determining the relative position of a TV camera.

Cross Reference to Related Applications

This application was filed under 35 U.S.C. §371 and claims priority to PCT application Ser. No. PCT/GB/02227 filed on Sep. 9, 1996. This application also claims priority under 35 U.S.C. §119 to United Kingdom Pat. application Ser. No. 9518432.1 filed on Sep. 8, 1995.

Chroma Key panels are known for use in TV studios. By focusing a TV camera onto a chroma-key background (or panel) and positioning a foreground object in front of the panel a combined picture can be created in which the foreground object appears against a virtual background which can be, for example, a still picture or a video sequence.

A problem which arises from this basic technique is that the camera cannot be allowed to move because the virtual background and the foreground object (possibly a TV presenter) will not move synchronously as in real life.

In JP 57-93788 a chroma-key panel is used which includes a series of equidistant parallel lines, FIG. 11, of two different shades of backing colour to monitor any changes in zoom which are manifested as changes in the frequency of the video signal. The boundaries of a chroma-key window are detected in order to fit the inserted image in size and position to the chroma-key window.

Perspective can be solved by using a two shade pattern with characteristic features etc. Such features may include characters, symbols, vertices of polygons etc. Whenever at least the image features can be matched with the physical pattern the perspective can be solved.

For the purpose of the present invention, the description will generally be confined to the use of a TV camera within a virtual studio but it is to be understood that the invention can be used for general tracking of a TV camera or an object on which it is positioned.

In co-pending Israeli Patent Application No. 109,487 to the same applicant, the use of chroma-key patterned panels is disclosed. These panels have a defined pattern which allows the video signals generated by the TV camera to be processed to ascertain the position of the camera.

A problem which arises in the above prior art systems is that for large zoom in factors the features in the Field of View (FOV) are reduced in number. Also, for a substantial occlusion the recognition of robust features may be difficult. Since the present invention movement and zoom of the camera are permitted and also the foreground object is allowed to move, these circumstances are very likely to occur.

In addition large perspective distortion makes the recognition of features very difficult in particular when said features comprise characters, graphical symbols etc.

If the camera loses synchronism between the foreground real object and the virtual background then the effect will be a loss of reality in the composite picture. Thus, as explained above, early previous systems were limited to a static camera and the later systems, although allowing camera movement, may still be subjected to a loss of synchronism between foreground and background.

Obviously if none of the patterned chroma-key background is visible then synchronism cannot be maintained but also is not necessary since no virtual background will be shown.

As the camera zooms in to the foreground object, the background chroma-key panel will become more occluded by the foreground object and the characteristic pattern will be broken and/or distorted in the case of large perspective views.

It is an object of the present invention to provide a TV camera position determination apparatus and method for measuring the position of a TV camera relative to a panel when part of the panel is occluded by a foreground object.

It is also an object of the present invention to provide a virtual studio system in which the TV camera is able to be moved laterally with respect to a foreground object and to a background chroma-key panel; in which the camera is able to zoom in and out with respect to the foreground object without losing synchronism between the foreground object and the virtual background even when the chroma-key panel is substantially completely occluded by the foreground object.

It is also a further object of the present invention to provide a camera positioning apparatus in which the position of a TV camera relative to a patterned panel can be determined even when a substantial part of the panel is obscured by an occluding object.

The present invention therefore provides a method of determining the position of a TV camera relative to a patterned panel being viewed by the TV camera including the steps of identifying a plurality of edge points of the pattern from the video signal produced by said camera and using these edge points to calculate the perspective of the pattern relative to the camera.

Preferably the method comprises the steps of identifying a plurality of said first edge points and a plurality of said second points; and producing an edge image.

Preferably two or more families of edges are used such that the edges of each family lie on a set of parallel lines comprising at least two lines. Preferably the orientations of the families are sufficiently far apart such that an edge point can be assigned to a specific family by means of its orientation only.

In a specific embodiment said patterned panel comprises a pattern of vertical and horizontal straight edges defining lines delineating a colour difference and in which each edge point is situated on one of said horizontal or vertical straight lines.

In a first embodiment said plurality of first edge points are clustered to associate edge points to specific lines using a slope and intercept process.

In a second embodiment steps of processing the video signal relating to said first and said second plurality of edge points comprise the steps of analysing all detected edge points and grouping together edge point into a first plurality of groups corresponding to horizontal lines and a second plurality of group corresponding to vertical lines.

Preferably the edge points in the first and second plurality of groups are allocated preliminarily to specific horizontal and vertical lines.

Preferably the step of allocation is followed by computation of the vanishing points of the horizontal and vertical lines, said vanishing points being computed within a defined location error.

The perspective projection of any set of parallel lines which are not parallel to the image plane, will converge to a vanishing point. In the singular case where the lines are parallel to the image plane, the vanishing point is at infinity.

Preferably the method also includes the step of projecting the edges corresponding to horizontal edges to obtain an edge projection profile map comprising peaks and troughs.

Preferably in the projection process a vertical accumulator array H[y] is cleared to zero. Then for each horizontal edge, the line connecting the vanishing point (previously computed for horizontal edges) with the edge is computed. That line is then intersected with the vertical axis (x=0). The cell of the accumulator array which corresponds to the intersection point is then incremented. Peaks in that array correspond to candidate lines.

Preferably the method further includes the step of assigning each horizontal edge to a most probable peak and producing a list of edges for each of a plurality of candidate lines indicated by the peak.

Preferably a line is specified for each list of edges, edges not corresponding to any specified line being disregarded.

The method steps are then preferably repeated for vertical edges and lines.

In the method an accurate video image edge line pattern is produced and in which the known pattern on the panel is compared with the edge line pattern.

This comparison preferably comprises a first step of identifying a first horizontal line in the accurate video image edge pattern, identifying a second horizontal line in the accurate video image pattern, calculating the distance between said first and second video image lines, comparing the calculated distance between the video image lines with the known pattern to produce a horizontal position and scale determination, repeating said steps to produce a vertical position and scale determination and from said horizontal and vertical position and scale determinations.

Once all positions and scales have been determined, the matching between the pattern and the image is now complete. Preferably, that matching is used to solve for the final, accurate perspective transformation between the pattern and the image.

Preferably, the perspective transformation is used to solve for the position of the TV camera relative to the panel.

Preferably the patterned panel comprises a chroma-key panel having two separately identifiable chroma-key colours. Preferably the patterned panel comprises two or more distance coded families of lines.

In a further preferred embodiment the patterned panel comprises two or more families of lines such that the lines of each family intersect at a common point.

The present invention also provides apparatus for determining the position of a TV camera relative to a patterned panel being viewed by the TV camera including:

means for identifying a plurality of edge points of the pattern from the vedeo signal produced by said camera and means for processing these edge points to calculate the perspective of the pattern relative to the camera.

Embodiments of the present invention will now be described, by way of example with reference to the accompanying drawings in which:

FIG. 4 shows a complex perspective view from one side and above;

FIG. 5 illustrates the process for identification of edge points;

FIG. 6 illustrates diagrammatically the initial vanishing point calculation for the edge points;

FIG. 7 illustrates diagrammatically the rectified line image;

Figure 1:
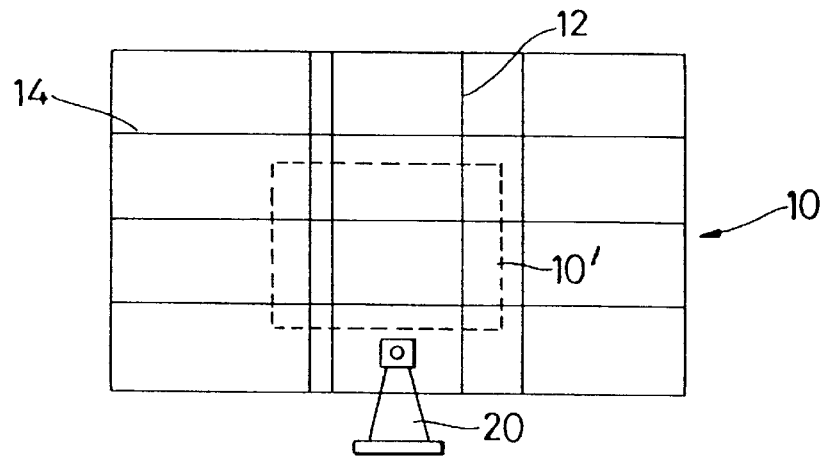
FIG. 1 shows a patterned panel for use in the present invention.

With reference now to the drawings, FIG. 1 shows a patterned panel 10 which comprises a plurality of vertical and horizontal lines 12,14. These lines may be formed from narrow line or stripes of different colour, their function being to provide a plurality of defined edges.

For chroma-key panels the colours of the lines or stripes will preferably be different shades of the same colour.

The lines need not be horizontal or vertical but will preferably always be parallel straight lines with a predetermined angular relationship between the generally horizontal and vertical lines. Preferably in any pattern two or more families of edges are provided such that the edges of each family lie on a set of parallel lines comprising at least two lines. Also preferably the orientations of the families are far apart such that an edge point can be assigned to a specific family by means of its orientation only.

The TV camera 20 indicated diagrammatically is shown in FIG. 1 viewing the panel directly from the front.

Figure 2:
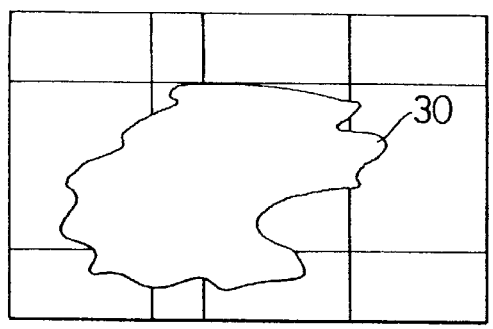
FIG. 2 shows a close up of a portion of the panel of FIG. 1 with an occluding object obscuring part of the pattern.

In FIG. 2 the video image viewed by camera 20 is shown. The TV camera 20 is operated to zoom in to the area 10' shown dotted in FIG. 1 and an occluding object 30 of irregular shape is shown occluding part of the pattern. The pattern in FIG. 2 is therefore not continuous and it may be seen that there are no continuous horizontal lines in the zoomed video image.

In FIG. 2 only one occluding object is shown but there may be several producing further discontinuities in the lines.

Figure 3:
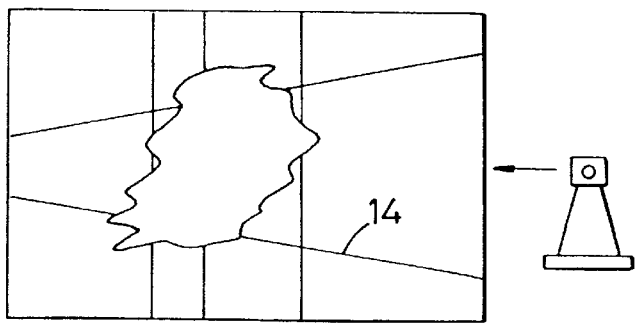
FIG. 3 shows a perspective view of FIG. 2 from one side.

In FIG. 3 the camera has been moved to create a simple perspective which illustrates that the generally horizontal lines 14 are not now parallel and in FIG. 4 in the more complex perspective, neither the horizontal or vertical lines are parallel.

With the change in size of the pattern, discontinuities in the lines and the non-parallel image matching the video image pattern in FIG. 4 with a pattern of the panel stored in digital format will be extremely difficult since no part of the video image corresponds to the stored pattern.

The method of the present invention provides a means for determining the position of the TV camera from the video image of FIG. 4.

Preferably in the pattern of FIG. 1 the line spacings are not all equal such that distance ratios in sets of adjacent lines are unique within the family of either horizontal or vertical lines. Thus if it is possible to identify the line spacing between two vertical lines 121, 122 and two horizontal lines 141, 142 then the area of the pattern forming part of the video image can be identified.

However, because of the unknown magnification or zoom of the TV camera, the unknown complex perspective and occlusion the lines appear totally different from the pattern in FIG. 1.

The method comprises identifying a large plurality of edge points 144 as shown in FIG. 4. Each edge point may be considered to comprise a mini-line having slope and intercept as indicated by angle 148. It may also have a nominal direction if it is on a line of any thickness as indicated by arrow 146. The locations of these edge points are stored digitally to provide an initial edge point map. As can be seen in FIG. 4 there may be substantial blank areas in the centre portion where the occlusion occurs but within this area there may be false edge points not correctly belonging to the pattern which will be recorded and will require to be discarded.

The edge points are allocated in groups to specific lines in the horizontal and vertical directions using the Hough transform [J. Illingworth and J. Kittler, A survey of the Hough transform, Computer Vision, Graphics and Image Processing, 26, pp. 139–161 (1986)].

Alternatively the initial parallelism of line sets is used to provide approximate positions of line sets in the horizontal and vertical directions.

It may be seen from FIG. 4 that none of the lines are either horizontal or vertical due to the perspective change. These terms are therefore used herein generally to refer to lines which are substantially horizontal or vertical, that is to say nearer to the horizontal rather than to the vertical and vice versa.

With reference now to FIG. 5 each line, as approximately determined by either grouping of the edge point and/or by computation of the initial parallelism of the line sets is projected to an approximate vanishing point for both horizontal (150) and vertical lines (152). As shown the lines will not intersect at a single point because the of the errors and thus a "circle" of error 150, 152 is allowed, the centre of the circle, for example, being considered to be the vanishing point. When the camera is looking perpendicular to the panel, the vanishing point is at infinity. Working in a homogeneous coordinate system, the latter case can be handled as well.

Figure 8:
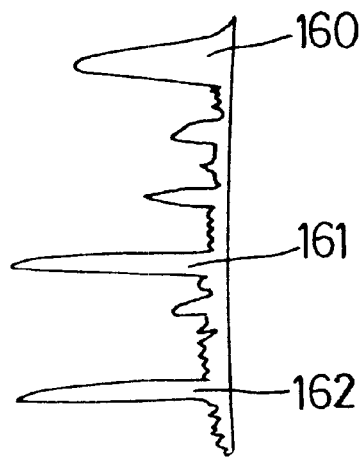
FIG. 8 illustrates the projected line images for the horizontal lines.

With reference to FIG. 7, the horizontal vanishing point is used to cluster the horizontal edge points into lines. The line connecting the vanishing point Ph with edge point E1 is intersected with the vertical axis. The process is repeated for all horizontal edge points. Clearly, for real lines which are characterised by a multitude of edge points, the intersection points will tend to accumulate as shown in FIG. 7. False edges or very short visible lines will contribute mode randomly. In FIG. 8, the intersections provide a histogram type waveform. The process is described for horizontal lines but will be repeated for the vertical lines.

Each edge point is reassessed by assigning it to the most probable peak and a revised list of edges is then stored for each probable candidate such as 160, 161, 162 in FIG. 8.

Those edge points which are found not to correspond to a probable candidate are discarded. thus, for horizontal lines, a list of edge points has now been produced which will accurately align with the horizontal lines 141, 142, line 141 being, for example, aligned with peak 161 and line 142 with peak 162 by means of a list of edge points for each line. The lines are therefore accurately detected.

This process is then repeated for the vertical lines.

The edge points assigned to a most probable peak are processed to find a line passing through these points in some optimal sense. For example, the least-squared error line can be computed. The vanishing points can be now computed more accurately, as a most probable intersection points of a set of horizontal (or vertical lines).

Figure 9:
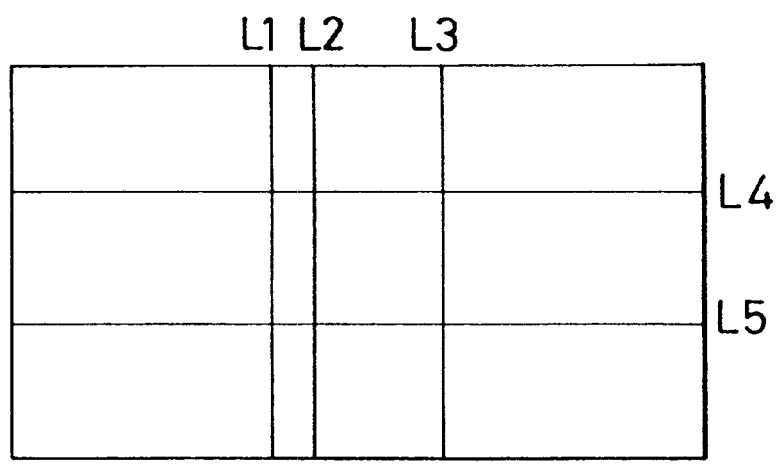
FIG. 9 shows the accurate video lines after final processing for comparison with the pattern of FIG. 1.

Let the vanishing point of the horizontal bundle be given in homogeneous coordinates by (Xh, Yh, Wh). Also let the vanishing point of the vertical bundle (or set of lines) be given by (Xv, Yv, Wv). These points correspond to vanishing points (1,0,0) and (0,1,0) of the parallel bundles on the panel. From this correspondence, the perspective transformation can be solved up to the shift and scale determinations for both bundles. Applying the inverse transformation to the detected lines, produces an accurate grill pattern as shown in FIG. 9.

This pattern is then matched against the stored pattern (FIG. 1) for each axis independently. In the search process each line L4 may be any line in the horizontal pattern. L5 is, however, the next line and the distance or pattern being unique the lines can be identified. If we assume that no lines are missing then we have a matching solution in the horizontal direction and by a similar process we will have a matching solution in the vertical direction.

If some lines are missing then a score is determined for the number of other matching lines and a search can be conducted, using the knowledge of the matched lines, for any missing lines. If these are totally obscured then a decision can be taken on a match using a threshold value for the scores for both vertical and horizontal directions.

To obtain the exact vanishing points and perspective, the corrected list of edge points for each line is used to provide accurate line equations, thereby enabling the vanishing points to be accurately calculated.

Having matched the lines, one knows not only the perspective distortion as before but also the shifts and scales. This completes the determination of the perspective transformation and thereby the position of the TV camera relative to the panel.

The system can provide such information either in the case that one or more lines in the pattern are obscured totally or in the event that the lines are discontinuous. The system can, therefore, work with high camera zoom parameters where only a very small fraction of the panel is visible.

Figure 10A:
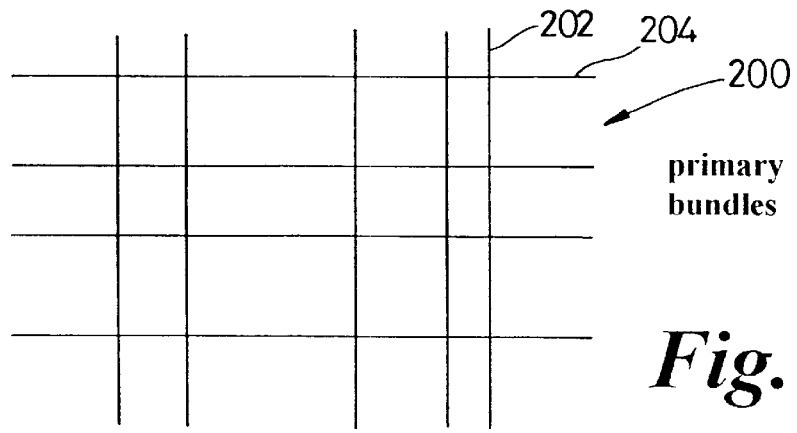
FIG. 10 illustrates the inventive concept of using coded bundles of lines.
Figure 10B:
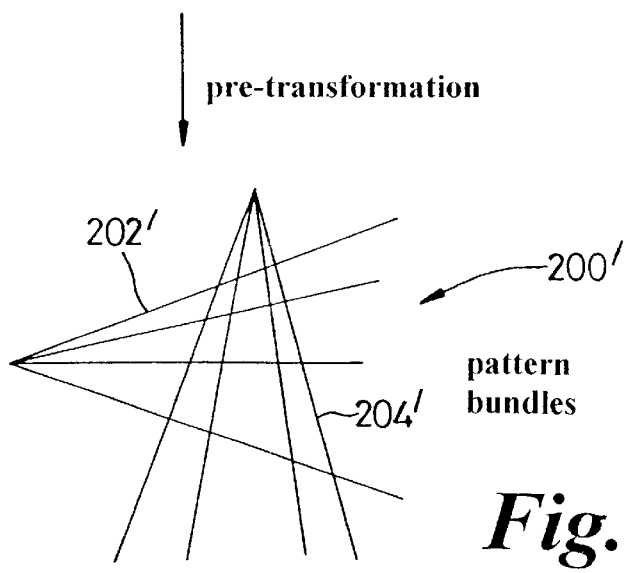

With reference now to FIG. 10, the concept of a parallel family of lines can be extended to an intersecting family using an alternative system of coded bundles 200 (FIG. 10a) (families of lines). The lines are not parallel, yet one can use basically the same techniques.

Figure 10C:
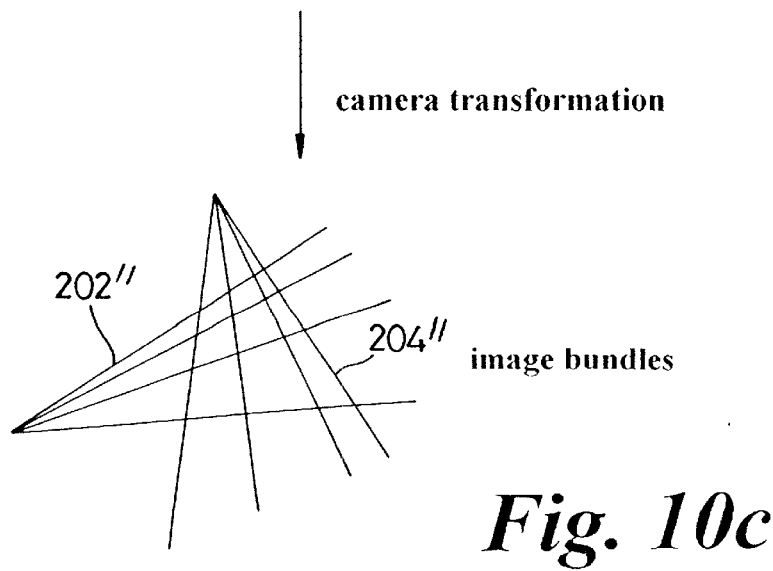

Consider two parallel coded bundles 202', 204' ("primary bundles") which is transformed by a known perspective transformation (the "pre-transformation") in the panel design process to 2 intersecting bundles ("pattern bundles"). These bundles are further transformed by the (unknown) camera perspective transformation and appear as "image bundles" 202", 204" (FIG. 10c).

Clearly, the combination of the pre-transformation and the camera transformation is an unknown perspective transformation. We proceed as in the usual algorithm to find that unknown transformation (between the primary bundles FIG. 10a and the image bundles FIG. 10c). Once that transformation is known, we use the pre-transformation to extract the camera transformation (between the pattern bundles and the image bundles).

Figure 11:
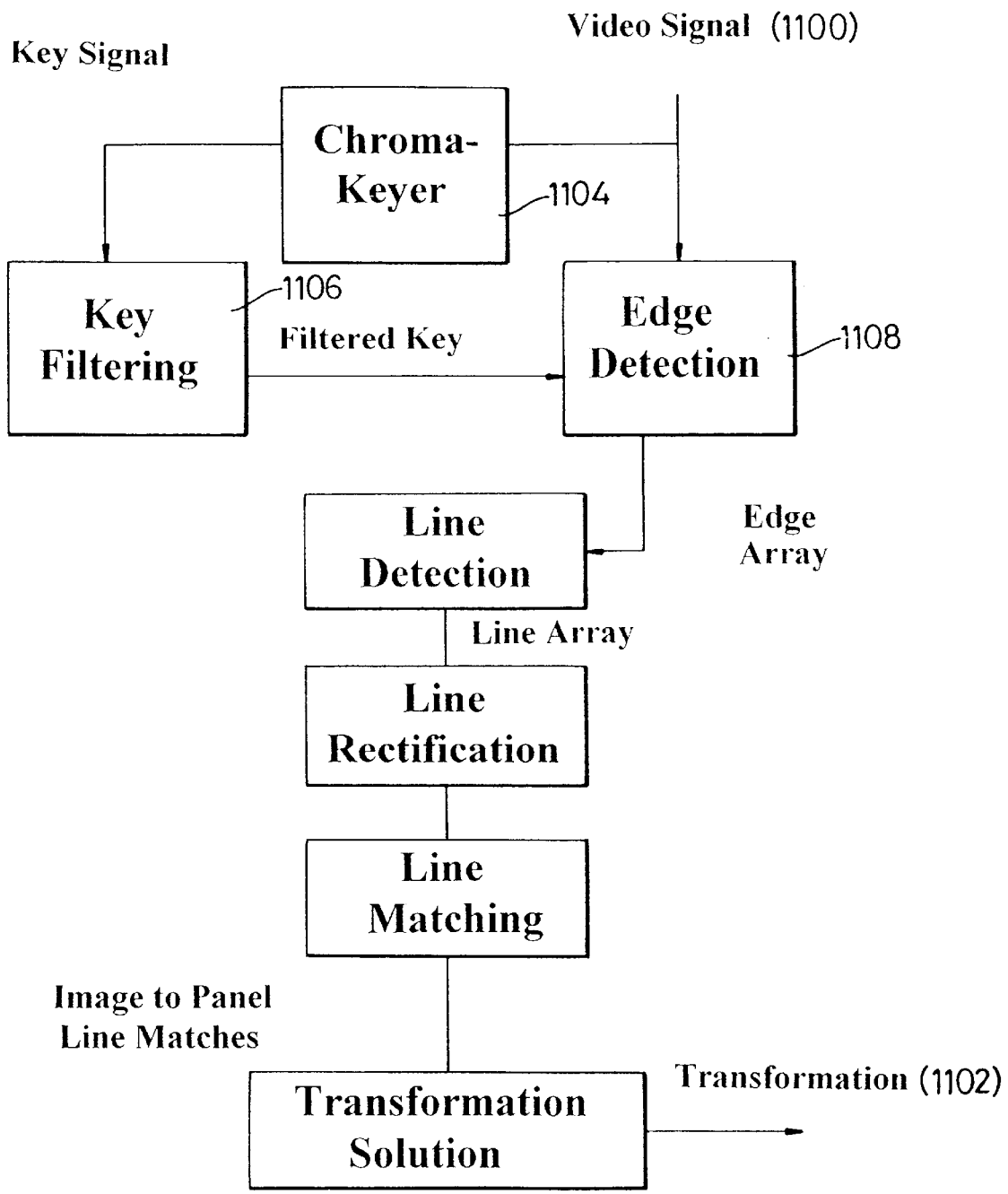
FIG. 11 shows the top level flow of processing.

FIG. 11 shows the top level flow of the processing, staring from a video signal 1100 and producing an estimate of the perspective transformation 1102 from the panel to the image. To reduce the number of false edges due to foreground objects, a chroma-keyer 1104 is used to segment the background (which contains the pattern information) from the foreground. This segmentation is performed based on a key signal which describes the distance of a specific pixel from the backing colour (preferably blue or green). To further reduce the number of false edges the key image is preferably filtered 1106 to remove isolated features and pixels near the border of foreground objects. This filtering is preferably done using morphological image processing [Serra, J. Image Analysis and Mathematical Morphology, Academic Press, London 1982].

Edge detection is then applied 1108 to the background image. The method is not sensitive to the specific edge detector used. For a survey see [A. Rosenfeld and A, Kak, Digital Picture Processing, Academic Press 1982, Vol. 2, pp. 84–112].

Preferably the edge detection process consists of the following steps:

1. Smoothing the image to reduce the effect of image noise.
2. Computing a gradient vector (magnitude and directions) at each pixel, by means of x and y spatial derivatives.
3. Thresholding the gradient magnitude and suppressing pixels where the gradient response does not have a local maximum. This suppression step is necessary to obtain thin edge contours.
4. Storing the edge points in an edge array.

Figure 12:
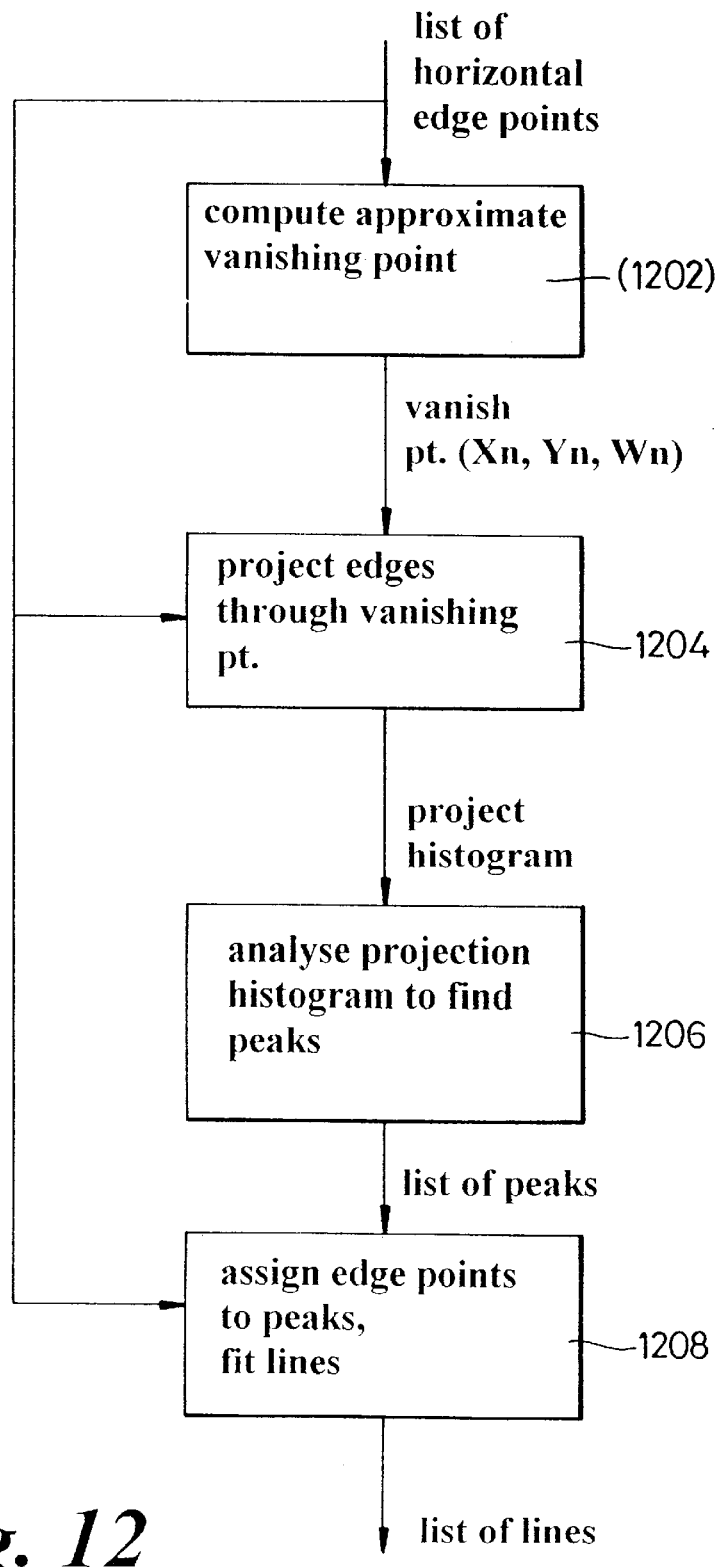
FIG. 12 illustrates the line detection process.

The line detection process is further described with reference to FIG. 12 for horizontal lines. Vertical lines are processed in a similar manner.

From a list of horizontal edge points an approximate vanishing point is computed 1202. Each edge is projected through a vanishing point 1204 to produce a projection histogram which is analysed 1206, to find the peaks. The list of peaks is compared with each edge point to assign an edge point to a peak and to then fit the lines 1208 to provide a list of lines.

What is claimed is:

1. A method of determining the position of a TV camera relative to a patterned panel, comprising a pattern of vertical and horizontal straight lines that delineate a color difference, being viewed by the TV camera, comprising:
    identifying a plurality of edge points, which are each disposed on one of said horizontal or vertical straight lines, from a video signal of the patterned panel produced by said camera;
    using these edge points to calculate a perspective of the patterned panel relative to the camera, comprising
        (i) clustering the plurality of edge points to associate edge points and to specific lines using a slope and intercept process;
        (ii) analyzing all identified edge points and grouping at least some of the identified edge points into a first group that corresponds to the horizontal lines and a second group that corresponds to the vertical lines;
        (iii) allocating the first and second groups to specific horizontal and vertical lines;
        (iv) computing vanishing points of the specific horizontal and vertical lines, said vanishing points being computed within a defined location error and projecting the edge points that were allocated to specific horizontal lines from the computed vanishing point of the horizontal lines to obtain an edge projection profile map comprising peaks and troughs;
    and determining a relative position of the camera relative to the patterned panel by reference to the perspective of the patterned panel.

2. The method as claimed in claim 1 wherein identifying a plurality of edge points comprises identifying a plurality of first edge points and a plurality of second edge points from the plurality of edge points; and wherein using these edge points further comprises producing an edge image from the plurality of first edge points and the plurality of second edge points.

3. The method as claimed in claim 1, further comprising:
    assigning each edge point that was allocated to a specific horizontal line to a most probable peak of an edge projection profile map and for a given most probable peak producing a list of lines from a plurality of candidate lines that may be indicated by the given most probable peak.

4. The method as claimed in claim 3 further comprising either specifying a line from the patterned panel for each list of lines or discarding each list of lines that does not correspond to a line of the patterned panel.

5. The method as claimed in claim 1 further comprising:
    projecting the edge points that were allocated to specific vertical lines from the computed vanishing point of the vertical lines to obtain an edge projection profile map comprising peaks and troughs;
    assigning each edge point that was allocated to a specific vertical line to a most probable peak and for a given most probable peak producing a list of lines from a plurality of candidate lines that may be indicated by the given most probable peak; and
    for each list of lines either specifying a line from the patterned panel that is indicative of the respective list of lines or discarding each list of lines that does not correspond to a line of the patterned panel.

6. The method as claimed in claim 4, wherein computing vanishing points comprises computing accurate vanishing points.

7. The method as claimed in claim 6 further comprising determining a shift and a scale of the patterned panel from the accurate vanishing points.

8. The method as claimed in claim 7, wherein determining a shift and a scale comprises producing an accurate line pattern by means of inverse perspective transformation and comparing the patterned panel with the accurate line pattern.

9. The method as claimed in claim 8, in which comparing the patterned panel comprises identifying a first horizontal line in the accurate line pattern, identifying a second horizontal line in the accurate line pattern, calculating a distance between said first and said second horizontal lines, comparing the calculated distance between the first and the second horizontal lines with the known patterned panel to produce a horizontal position and scale determination, identifying a first vertical line in the accurate line pattern, identifying a second vertical line in the accurate line pattern, calculating a distance between the first and the second vertical lines, comparing the calculated distance between the first and the second vertical lines with the known patterned panel to produce a vertical position and scale determination and from said horizontal and vertical position and scale determinations determining the position of the TV camera relative to the patterned panel.

10. The method as claimed in claim 1 wherein the patterned panel comprises a chroma-key panel having two separately identifiable chroma-key colours.

11. The method as claimed in claim 1 in which the patterned panel comprises two or more distance coded families of lines.

12. The method as claimed in claim 1 in which the patterned panel comprises two or more families of lines such that the lines of each family intersect at a common point.

13. The method as claimed in claim 10 in which the determination of the relative position of the TV camera relative to the patterned panel is used to calculate a perspective of a background video picture relative to a foreground object.

\* \* \* \* \*